UNITED STATES PATENT OFFICE.

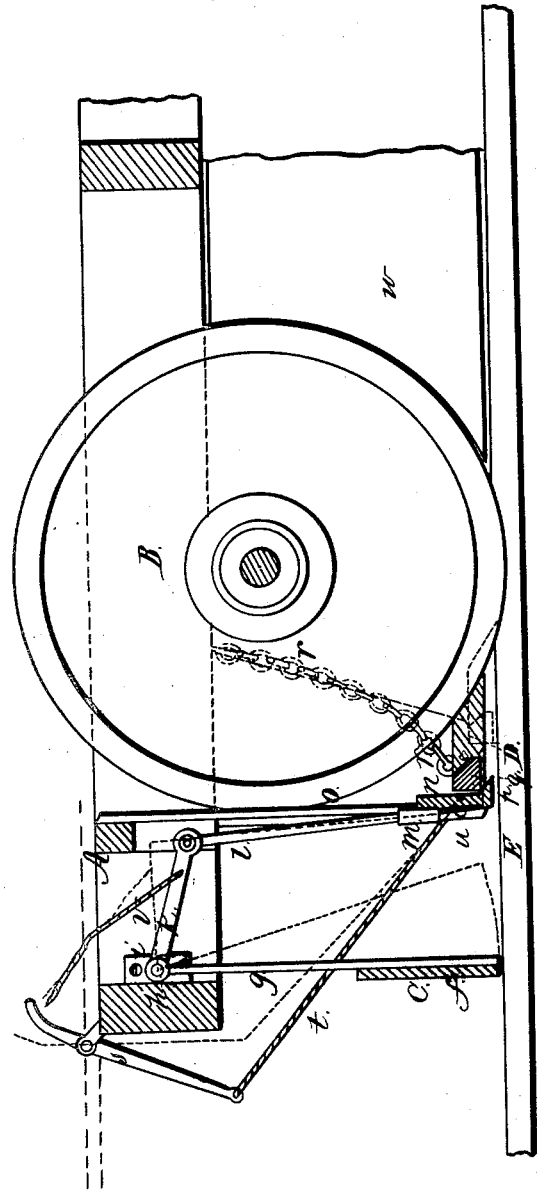

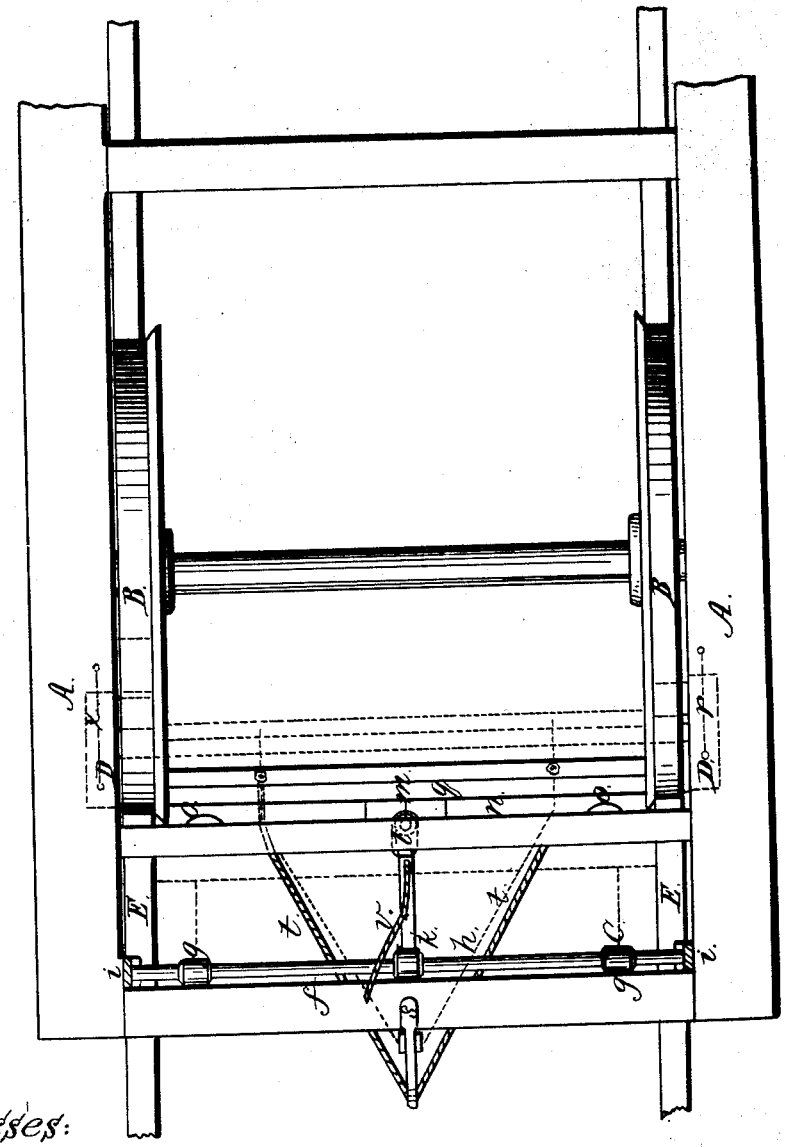

SAMUEL GREEN, OF LAMBERTVILLE, NEW JERSEY, ASSIGNOR TO HIMSELF, AND W. R. GREEN, OF PHILADELPHIA, PENNSYLVANIA.

SAFETY APPARATUS FOR CITY RAILROAD-CARS.

Specification of Letters Patent No. 24,776, dated July 12, 1859.

*To all whom it may concern:*

Be it known that I, SAMUEL GREEN, of Lambertville, in the county of Hunterdon and State of New Jersey, have invented a new and Improved Life and Limb Protector for Application to Horse-Cars of City Railroads; and I do hereby declare that the following is a full, clear, and exact description of the construction and operation of the same, reference being had to the annexed drawings, making a part of this specification, in which—

Figure 1 represents an inner side elevation, and Fig. 2 a top view, of one end of a car-truck, with the said invention applied thereto.

Like letters, in both figures, indicating the same parts.

The nature of my invention consists in providing a swinging frame and bolt in connection with brake-blocks, in front of the forward wheels of a city rail-road passenger-car, so arranged in relation to each other, that should a person fall upon the track, in getting in or out at the forward end of the car, or otherwise, while it is in motion, the said swinging frame shall be so operated from coming in contact with any part of the person on the track, as to let fall the brake-blocks before the wheels, and so, instantly arrest the rotary motion of the said wheels and prevent them from either coming into contact with, or passing over, any part of the said person.

In the drawings, A, represents the forward end of the frame of a city passenger-car; B, B, the front wheels; C, the swinging frame; D, D, the drop brake-blocks; and E, E, the track rails.

The swing frame (C) consists of a thin board *f*, suspended across, and nearly in contact with the track rails (E, E,) from the car frame (A), by means of the two arms, *g*, *g*, which are fixed on a bar *h*, which is pivoted at its ends so as to turn in bearings *i*, *i*, which are fixed on the frame (A)— all substantially as shown in the drawings. In the middle of this bar (*h*) another arm *k*, is fixed so as to project rearward, and has pivoted to its rear end, a long bolt *l*, whose lower end passes loosely through a hole or socket *m*, in another horizontal piece *n*, which is rigidly supported horizontally across and above the track rails (E, E), by means of the vertical pieces *o*, *o*, which are fixed to the frame (A). The lower rear-side of this piece (*n*) has an inclined plane, *p*, fixed near each end so as to receive and support the brake blocks (D, D,) above rails—substantially as shown in Fig. 1.

The brake blocks (D, D,) are connected together by a piece of timber *q*, and are each formed so as to fit into the angle produced between the tread of each of the wheels (B, B,) and its respective rail (E, or E'), when the said blocks are dropped upon the rails—as hereinafter described—the said blocks (D, D,) being also connected with the frame (A) by means of a strong chain, *r*, at each end, whose respective lengths are such as will allow the said blocks to fall into the angles between the wheels and track, before noticed, and yet prevent them from being passed over by the wheels.

At the forward end of the frame (A) a foot lever *s*, is arranged, whose lower end is connected with the brake bar (*q*) by means of the ropes *t*, *t*, so that when the upper end of the said lever (*s*) is pushed back, the brake blocks (D, D,) are drawn up thereby upon the inclined planes (*p*, *p*,); and when the foot is removed, the said blocks fall upon the track rails and come into contact with the tread of the wheels (B, B,).

In the middle of the brake-connecting piece (*q*) there is an eye or loop *u*, which is adapted to pass beneath the socket (*m*), when the piece (*q*) is drawn up on the planes (*p*, *p*,)—(the bolt (*l*) being first raised for the purpose) so as to receive into it the lower end of the said bolt when the latter is let fall for the purpose.

Attached to the arm (*k*) is a slender chain or strong cord, *v*, which passes up through the platform of the car so as to be—like the foot-lever (*s*)—within such convenient reach of the driver as will enable him to operate them as occasion may require. A sheet iron fender, *w*, may be fixed between each of the fore and aft wheels, as a further safe guard.

Operation: When the car is in motion the brake blocks (D, D,) are supported above the track rails (E, E) and out of contact with the wheels (B, B), as shown in the drawings, there being sufficient room, of course, above the said blocks (D, D,) for the application and operation of the usual brakes—which are not shown in the drawings. Suppose a person, in the act of getting in or out of the car while it is in motion, falls so as to be thrown upon the track in front of either of the wheels (B or B') or so as to have an arm or leg in that position—the swinging frame (C) will come in contact therewith, be moved backward, and so lift the bolt (l) and let drop the brake blocks (D, D,), which, coming into the position shown by the red lines in the figures, will immediately arrest the rotary motion of the wheels (B, B,), and prevent their passing over the part of the person which may be on the rails, and so save his life or limbs. After the person is removed, the driver, with his hand, pulls on the cord (v) so as to lift the bolt (l), and then, by pressing with his foot upon the lever (s), draws up the brake-blocks (D, D,) upon the inclines (p, p,) into contact with the stationary carrying piece (n), when—letting go of the rope (v), the swinging frame forces the bolt (l) into the eye or loop (u), and so secures the brake blocks, as before.

The brake blocks (D, D,) could as well be drawn up by means of a hand-cord; but as a stone upon the track, or a strong headwind would swing back the frame (C) and drop the brake blocks, the said foot lever (s) is best, because it enables the driver to guard against such a result, as by thus holding the brake-blocks (D, D) the lifting of the bolt (l) by the accidental movement of the frame (C) will not release the said blocks from the lever (s).

It will be readily perceived that this apparatus, when applied as described, will effectually prevent the loss of life or limbs of those who may accidentally fall or be thrown upon the track in front of the wheels—accidents which have been very numerous and fatal since the introduction of these now indispensible means of travel, in cities.

Having thus fully described my apparatus, and pointed out its utility, what I claim as new therein of my invention, and desire to secure by Letters Patent, is—

The swinging frame (C) in connection with the bolt (l) and cord (v); the brake-blocks (D, D,) in connection with the chains (r, r,) and cords (t, t,); and the stationary supporting-piece (n); the same, or their equivalents, being arranged, applied and operated substantially in the manner and for the purpose set forth and described.

SAMUEL GREEN.

Witnesses:
W. N. KEIPER,
JOHN O. HULL.